United States Patent
Ruffa

(10) Patent No.: US 7,266,046 B1
(45) Date of Patent: Sep. 4, 2007

(54) MINIATURE LOW FREQUENCY ACOUSTIC TRANSMITTER

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/473,420

(22) Filed: Jun. 26, 2006

(51) Int. Cl.
*G10K 11/02* (2006.01)
(52) U.S. Cl. ..................................... 367/171
(58) Field of Classification Search ............... 367/171, 367/143, 144, 140
See application file for complete search history.

(56) References Cited

U.S. PATENT DOCUMENTS

| | | | |
|---|---|---|---|
| 3,437,170 A | 4/1969 | Brock | |
| 3,493,072 A | 2/1970 | Johnston | |
| 4,890,687 A * | 1/1990 | Medlin et al. | 367/171 |
| 4,961,175 A | 10/1990 | Blue et al. | |
| 4,961,181 A | 10/1990 | Elliot | |
| 5,999,491 A | 12/1999 | Harvey et al. | |
| 2003/0138120 A1 | 7/2003 | Tripoli, III | |

OTHER PUBLICATIONS

Claude C. Sims, Bubble Transducer for Radiating High-Power Low-Frequency Sound in Water, The Journal of the Acoustical Society of America, Oct. 1960, pp. 1305-1308, vol. 32, No. 10.

* cited by examiner

*Primary Examiner*—Dan Pihulic
(74) *Attorney, Agent, or Firm*—James M. Kasischke; Jean-Paul A. Nasser; Michael P. Stanley

(57) ABSTRACT

A miniature lightweight transmitter that mechanically generates low-frequency acoustic energy is described, wherein one or more miniature balloons filled with air are positioned at the center of a pressure vessel filled with water and tethered in place. The system is then driven into resonance by using transducers that directly drive the wall of the pressure vessel or by using a piston to drive fluid into and out of the pressure vessel.

9 Claims, 2 Drawing Sheets

MINIATURE LOW FREQUENCY ACOUSTIC TRANSMITTER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention is directed to low frequency acoustic transmitters, and more specifically to a miniature lightweight transmitter that mechanically generates low-frequency acoustic energy by using one or more resonant gas bubbles.

(2) Description of the Prior Art

Generating coherent acoustic energy by mechanical means leads to very large systems when low frequencies are required. For example, a resonant projector system has a natural frequency of $\sqrt{k/m}$ where k and m are the effective mechanical stiffness and mass, respectively, of the resonant projector system. Decreasing k and increasing m both tend to increase dimensions. Non-resonant systems (i.e., moving coil projectors) also increase in size and weight as the required upper frequency is decreased to maintain a given sound pressure level (SPL). A system can be as small as needed if there are no SPL requirements. What is needed is a mechanical means of generating coherent acoustic energy at low frequencies contained by a small system. Such a system would ideally use resonant gas bubbles such as air bubbles in a fluid such as water. A resonant gas bubble resonates very effectively at low frequencies with small dimensions. The effective stiffness of a resonant air bubble for example is governed by that of air, while its effective mass is that of the added mass of the surrounding water. For example, a 1 cm radius bubble resonates at approximately 300 Hz. In general the formula for the resonant frequency is as follows:

$$f_r = \frac{1}{2\pi a} \sqrt{\frac{3\gamma P_0}{\rho_0}} \quad (1)$$

Here $P_0$ is the hydrostatic pressure, $\rho_0$ is the density of water, and $\gamma$ is the ratio of specific heats of the gas (i.e., air), and a is the bubble radius. The bubble frequency response is narrow band in nature, requiring a plurality of different sized bubbles if a broadband waveform is required.

SUMMARY OF THE INVENTION

It is a general purpose and object of the present invention to disclose a mechanical means of generating coherent acoustic energy at low frequencies contained by a small system.

It is a further object of this invention to generate coherent acoustic energy through the use of resonant air bubbles in water.

It is a further object of this invention to deploy such an acoustic energy generator in bodies of water such as lakes, seas and oceans.

The above objects are achieved with the present invention by tethering a miniature balloon filled with air at the center of a pressure vessel filled with water. The system is then driven into resonance by using transducers that directly drive the wall of the pressure vessel with acoustic energy or by using a piston to drive fluid into and out of the pressure vessel.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION

Figure 1:
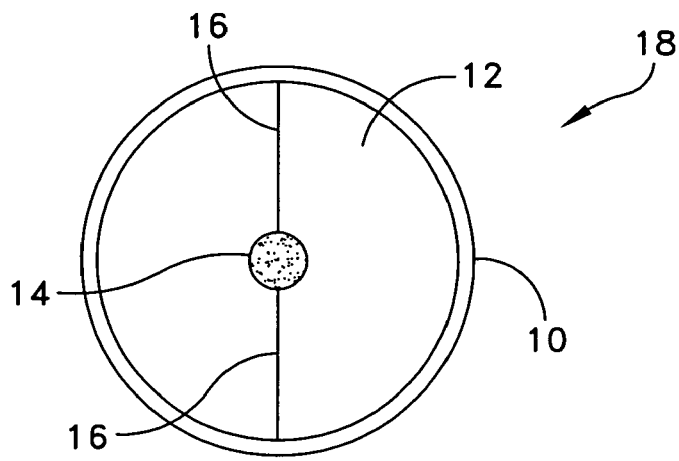
FIG. 1 is an illustration of a pressure vessel filled with water containing an air bubble encapsulated in a miniature balloon that is tethered to the center of the pressure vessel.

Referring to FIG. 1 there is shown a pressure vessel 10 filled with water 12 (other fluids may also be used). Contained within pressure vessel 10 is a miniature balloon 14 filled with air (other gases may be used to obtain different frequencies). The size of pressure vessel 10 depends on the desired frequencies to be generated, however, the walls of the pressure vessel 10 are at least a few radii away from the miniature balloon 14. The miniature balloon 14 serves to encapsulate the air bubble. The miniature balloon 14 has the same dynamic responses as the air bubble. The acoustic effects of the thin balloon membrane are negligible at the low frequencies achieved with the present invention. A tether 16 is used to position and secure the miniature balloon 14 at the center of the pressure vessel. The tether 16 holds the air bubble in the center of the pressure vessel, preventing it from rising against gravity. In one embodiment the pressure vessel 10 will be towed in large bodies of water as an acoustic source that radiates sound into the surrounding water. The pressure vessel 10 maintains a constant pressure so that the bubble size in miniature balloon 14 will not change with the water depth in which the pressure vessel is submerged, which would also change the bubble resonant frequency. If maintaining a constant resonant frequency is not important, then an ordinary closed or free-flooding vessel rather than a pressure vessel can be used. The combination of the pressure vessel 10 filled with water 12 and containing a tethered air filled miniature balloon 14 comprises a mechanical low-frequency acoustic energy generator system 18 that can be driven into resonance.

Figure 2:
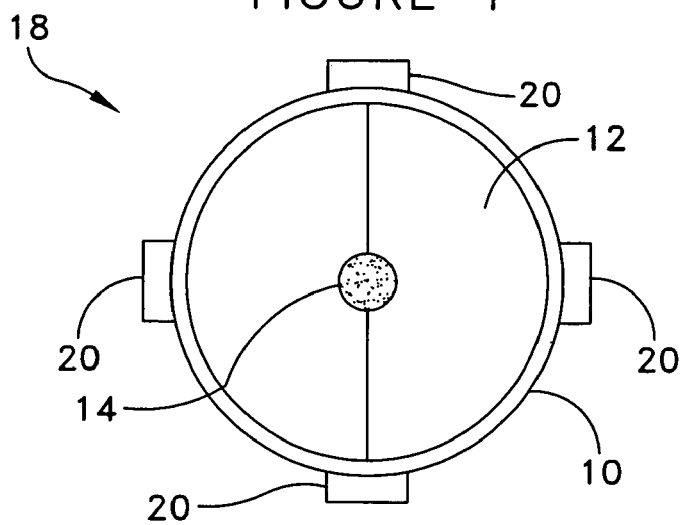
FIG. 2 is an illustration of the pressure vessel of FIG. 1 with transducers on the exterior walls.
Figure 3:
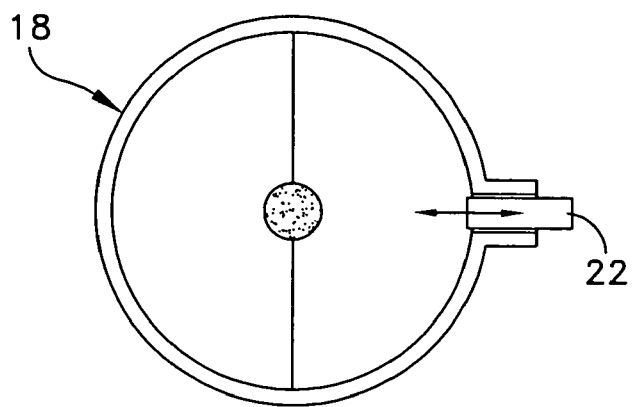
FIG. 3 is an illustration of a pressure vessel with a piston driven by a moving coil.

There are two ways that this system 18 can be driven into resonance. The first way is to use one or more transducers 20 that directly drive the wall of the pressure vessel 10 as illustrated in FIG. 2. Even though the pressure vessel 10 maintains a constant static pressure, it is possible to design the pressure vessel walls so that acoustic energy can be efficiently transmitted from transducers 20 mounted on the walls to the water 12 inside to excite the air bubble contained in miniature balloon 14, and radiated energy can also be transmitted back through the walls into the surrounding environment. Piezoelectric or moving coil transducers 20 may be used to drive the pressure vessel 10. The second way, as illustrated in FIG. 3, is to use a piston 22 driven by a moving coil to drive fluid into and out of the pressure vessel through an aperture in the pressure vessel.

Figure 4:
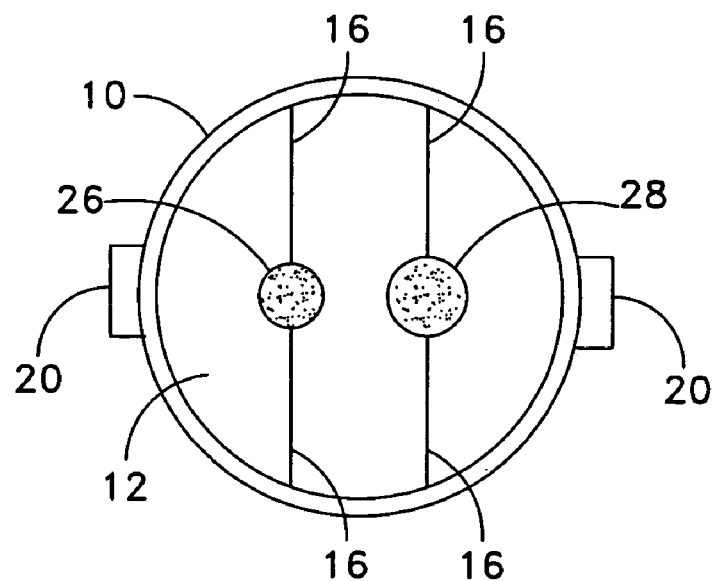
FIG. 4 is an illustration of an alternative embodiment of the invention using two miniature balloons having different radii.

Referring now to FIG. 4, there is illustrated a pressure vessel 10 with two miniature balloons 26 and 28 filled with air each miniature balloon 26 and 28 having different radii. The different sized air bubbles encapsulated in miniature balloons 26 and 28 resonate at different frequencies. For example, a miniature balloon can be included for every ⅓ octave center frequencies over the band of interest. The pressure vessel 10 will have some effect on the resonant frequency because it increases the overall stiffness of the system. It will not, however, have a significant effect on source level, since all of the acoustic energy generated within it will also radiate out.

Figure 5:
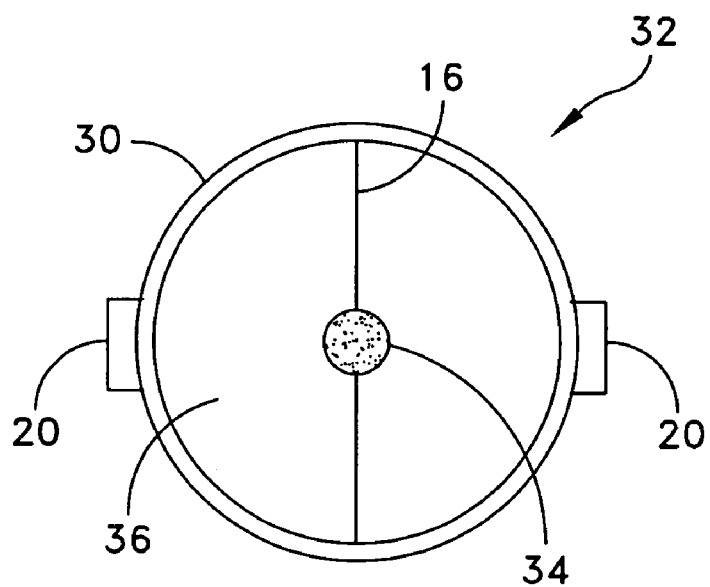
FIG. 5 is an illustration of an alternative embodiment of the invention using a miniature balloon in an open air container.

In an alternative embodiment of the invention an open air container 30 is used rather than a pressure vessel 10. The ambient pressure remains approximately constant. Referring to FIG. 5 there is illustrated in a mechanical low-frequency acoustic energy generator system 32 resonant at 30 HZ, a spherically symmetric model consisting of a 10 cm radius air bubble encapsulated in a miniature balloon 34 surrounded by an annular layer of water 36 in an infinite air medium. A simple spherically symmetric mode is used to analyze this system 32, however other shapes can be used. The model has a 10 cm radius air filled sphere surrounded by a 20 cm thick annular layer of water in an infinite air medium. The acoustic pressure fields in the three mediums are given below:

$$p_1 = \frac{A_1}{r} \sin k_1 r;$$

$$p_2 = \frac{A_2}{r} e^{ik_2 r} + \frac{B_2}{r} e^{-ik_2 r}$$

$$p_3 = \frac{A_3}{r} e^{-ik_3 r}$$

The pressure in the surrounding air consists of outgoing waves only, and thus will result in complex resonant frequency (to account for the damping because of acoustic energy radiated into the infinite medium). The acoustic particle velocity in the radial direction is generated using $$\frac{\partial p}{\partial r} = -i\omega \rho_0 u,$$

leading to the following:

$$u_1 = \frac{A_1 i}{\omega \rho_{01} r} \left[ \frac{k_1}{r} \cos k_1 r - \frac{1}{r^2} \sin k_1 r \right];$$

$$u_2 = \frac{A_2 i e^{ik_2 r}}{\omega \rho_{02} r} \left[ \frac{ik_2}{r} - \frac{1}{r^2} \right] - \frac{B_2 i e^{-ik_2 r}}{\omega \rho_{02} r} \left[ \frac{ik_2}{r} + \frac{1}{r^2} \right];$$

-continued $$u_3 = \frac{A_3 i e^{-ik_3 r}}{\omega \rho_{03} r} \left[ \frac{ik_3}{r} + \frac{1}{r^2} \right]$$

The resonant frequency is determined by solving the following equations:

$p_1 = p_2$ (at $r=a$);

$p_2 = p_3$ (at $r=b$);

$u_1 = u_2$ (at $r=a$);

$u_2 = u_3$ (at $r=b$);

Here the annular water layer has inner and outer radii of a and b, respectively. The four equations allow elimination of the four arbitrary constants, leading to the equation $$e^{-2ik_2 b} \left\{ -\rho_{03} \left( \frac{ik_2}{b} + \frac{1}{b^2} \right) + \rho_{02} \left( \frac{ik_3}{b} + \frac{1}{b^2} \right) \right\} \left\{ \frac{\rho_{02} k_1}{a} - \tan k_1 a \left[ \frac{(\rho_{02} - \rho_{01})}{a^2} + \frac{ik_2 \rho_{01}}{a} \right] \right\} =$$

$$e^{-2ik_2 a} \left\{ \rho_{03} \left( \frac{ik_2}{b} - \frac{1}{b^2} \right) + \rho_{02} \left( \frac{ik_3}{b} + \frac{1}{b^2} \right) \right\} \left\{ \frac{\rho_{02} k_1}{a} - \tan k_1 a \left[ \frac{(\rho_{02} - \rho_{01})}{a^2} + \frac{ik_2 \rho_{01}}{a} \right] \right\}$$

Since the bubble size is small compared to all wavelengths, the following approximations can be made with good accuracy:

$e^{-2ik_2 a} \cong 1 - 2ik_2 a$ $e^{-2ik_2 b} \cong 1 - 2ik_2 b$ $\tan k_1 a \cong k_1 a + \frac{1}{3}(k_1 a)^3$ With these simplifications, the above transcendental equation becomes polynomial in nature, and can easily be solved for the resonant frequency. It was found to be 46.5 Hz. If the outer radius is increased to 1 meter, the resonant frequency is lowered to 32.9 Hz. This compares to 32.6 Hz computed by the prior art formula (1) (which assume an infinite liquid medium). Thus a 20 cm radius sphere can be driven with a piston or pistons to produce high amplitude narrowband energy at 46.5 HZ.

This type of low frequency acoustic energy generator system is envisioned for use in sonar applications.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An apparatus for mechanically generating low-frequency acoustic energy comprising:

a vessel having exterior walls and an interior filled with a fluid;

at least one miniature balloon filled with a gas, said one miniature balloon being contained within said vessel wherein said miniature balloon serves to encapsulate a gas bubble and has the same dynamic responses as said gas bubble;

a tether joined to the interior of said vessel and to said at least one miniature balloon, wherein said tether is used to position and secure the miniature balloon in the vessel and to prevent said miniature balloon from rising against gravity;

a plurality of transducers joined to the exterior walls of said vessel, wherein said transducers directly drive the wall of the vessel with acoustic energy.

2. The apparatus of claim 1, wherein said vessel is a pressure vessel that maintains a constant pressure so that the encapsulated gas bubble will not change in size as said pressure vessel is submerged in a body of water, thereby maintaining a constant resonant frequency.

3. The apparatus of claim 1, wherein said vessel is a closed vessel.

4. The apparatus of claim 1, wherein said vessel is a free-flooding vessel.

5. The apparatus of claim 1, wherein a piston driven by a moving coil is joined to an aperture in said vessel such that said piston drives fluid into and out of the vessel through said aperture.

6. The apparatus of claim 1, wherein a plurality of miniature balloons filled with a gas and having different radii are contained in said vessel, wherein the different sized gas bubbles encapsulated in said miniature balloons resonate at different frequencies.

7. The apparatus of claim 6, wherein an additional miniature balloon filled with a gas is included for every ⅓ octave center frequencies over a band of interest.

8. An apparatus for mechanically generating low-frequency acoustic energy comprising:

an open air container;

a gas bubble encapsulated in a miniature balloon contained in said open air container;

an annular layer of water surrounding said encapsulated gas bubble;

a tether joined to said open air container and to said miniature balloon, wherein said tether is used to position and secure the miniature balloon at the center of the open air container and prevents said miniature balloon from rising against gravity;

a plurality of transducers joined to the exterior walls of said open air container, wherein said transducers directly drive the wall of the open air container with acoustic energy.

9. The apparatus of claim 8, wherein a piston driven by a moving coil is joined to an aperture in said open air container such that said piston drives water into and out of the open air container through said aperture.

\* \* \* \* \*